US005535224A

United States Patent [19]

Kondo et al.

[11] Patent Number: 5,535,224

[45] Date of Patent: Jul. 9, 1996

[54] AUTOMATIC PERFORMING SYSTEM CAPABLE OF DETECTION AND CORRECTION OF ERRORS IN PERFORMANCE INFORMATION

[75] Inventors: Tetsusai Kondo; Haruhiko Matsui, both of Hamamatsu, Japan

[73] Assignee: Kabushiki Kaisha Kawai Gakki Seisakusho, Hamamatsu, Japan

[21] Appl. No.: 436,872

[22] Filed: May 8, 1995

Related U.S. Application Data

[63] Continuation of Ser. No. 232,451, Apr. 22, 1994, which is a continuation of Ser. No. 948,294, Sep. 21, 1992.

[30] Foreign Application Priority Data

Dec. 9, 1991 [JP] Japan .................................... 3-324776

[51] Int. Cl.$^{6}$ .............................. G08C 25/02; H04L 1/18

[52] U.S. Cl. .............................................................. 371/32

[58] Field of Search ................................ 371/30, 32, 34, 371/33, 35

[56] References Cited

U.S. PATENT DOCUMENTS

| | | | |
|---|---|---|---|
| 3,473,150 | 10/1969 | McClelland | 371/32 |
| 4,132,141 | 1/1979 | Campbell et al. . | |
| 4,377,862 | 3/1983 | Koford et al. | 371/32 |
| 4,469,000 | 9/1984 | Fujiwara et al. | 115/84 |
| 4,567,804 | 2/1986 | Sawase et al. | 115/84 |
| 4,593,592 | 6/1986 | Stahnke | 21/84 |
| 4,622,682 | 11/1986 | Kumakura | 371/32 |
| 4,727,592 | 2/1988 | Okada et al. | 455/601 |
| 4,744,281 | 5/1988 | Isozaki | 1.28/86 |
| 4,779,274 | 10/1988 | Takahashi et al. | 371/32 |
| 4,800,548 | 1/1989 | Koishi et al. | 54/369 |
| 4,912,703 | 3/1990 | Sumida | 370/58.2 |
| 4,913,026 | 4/1990 | Kaneko et al. | 21/84 |
| 4,970,928 | 11/1990 | Tamaki | 21/84 |
| 5,016,513 | 5/1991 | Stahnke | 19/84 |
| 5,022,301 | 6/1991 | Stahnke | 21/84 |
| 5,072,644 | 12/1991 | Isozaki et al. | 609/84 |
| 5,083,491 | 1/1992 | Fields | 21/84 |
| 5,164,532 | 11/1992 | Ishii et al. | 639/84 |
| 5,196,639 | 3/1993 | Lee et al. | 603/84 |
| 5,210,367 | 5/1993 | Taguchi et al. | 84/746 |

FOREIGN PATENT DOCUMENTS

| | | | |
|---|---|---|---|
| 5-20315 | 2/1978 | Japan . | |
| 53-102020 | 9/1978 | Japan . | |
| 54-17011 | 2/1979 | Japan . | |
| 55-84088 | 6/1980 | Japan . | |
| 58-18691 | 2/1983 | Japan . | |
| 58-179894 | 10/1983 | Japan . | |
| 61-128295 | 6/1986 | Japan . | |
| 61-292431 | 12/1986 | Japan | 371/30 |
| 62-15840 | 4/1987 | Japan . | |
| 63-37395 | 2/1988 | Japan . | |
| 63-131632 | 6/1988 | Japan | 371/30 |
| 63-217908 | 8/1988 | Japan . | |
| 63-44867 | 11/1988 | Japan . | |
| 63-301997 | 12/1988 | Japan . | |
| 64-44936 | 2/1989 | Japan . | |
| 64-247666 | 9/1989 | Japan . | |
| 64-291944 | 11/1989 | Japan . | |
| 1-332912 | 12/1989 | Japan . | |
| 3-020797 | 1/1991 | Japan . | |
| 3-194597 | 8/1991 | Japan . | |
| 2-164192 | 3/1986 | United Kingdom . | |
| WO80/02886 | 12/1980 | WIPO . | |

*Primary Examiner*—Hoa T. Nguyen
*Attorney, Agent, or Firm*—Davis, Bujold & Streck

[57] ABSTRACT

An automatic performing system includes a performance information transmitting unit and a performance information receiving unit. Performance information is transmitted from the performance information transmitting unit to the performance information receiving unit. The transmitting unit waits for returned performance information from the receiving unit and compares the returned information with the transmitted information. If the returned information is determined to be unequal to the transmitted information, a retransmission command is transmitted to the receiving unit, thereby prohibiting the receiving unit from using incorrectly received performance information and ordering the receiving unit to wait for the next transmission from the transmitting unit. Thus, correctly received performance information is processed on a real time basis.

11 Claims, 8 Drawing Sheets

FIG.3

| | | |
|---|---|---|
| FIRST BYTE | IDENTIFICATION CODE | ONE EVENT DATA |
| SECOND BYTE | KEY NUMBER DATA | |
| THIRD BYTE | KEY DEPRESSION INTENSITY DATA | |
| FOURTH BYTE | TIME DATA | |
| FIRST BYTE | IDENTIFICATION CODE | ONE EVENT DATA |
| SECOND BYTE | KEY NUMBER DATA | |
| THIRD BYTE | KEY DEPRESSION INTENSITY DATA | |
| FOURTH BYTE | TIME DATA | |
| FIRST BYTE | IDENTIFICATION CODE | ONE EVENT DATA |
| SECOND BYTE | KEY NUMBER DATA | |
| THIRD BYTE | KEY DEPRESSION INTENSITY DATA | |
| FOURTH BYTE | TIME DATA | |

AUTOMATIC PERFORMING SYSTEM CAPABLE OF DETECTION AND CORRECTION OF ERRORS IN PERFORMANCE INFORMATION

This is a continuation of copending application Ser. No. 08/232,451 which was a FWC of U.S. Ser. No. 07/948,294 filed Sep. 21, 1992 filed on Apr. 22, 1994.

BACKGROUND OF THE INVENTION

This invention relates to an automatic performing system in which a performance is reproduced and/or recorded by using correct performance information, and in which an error in the transmission is corrected while the performance information is transmitted and received between performance information transmitting and receiving units. This invention more particularly relates to an automatic performing system that is applied to the transmission of performance information on a real-time basis while the performance is in progress, and not to packet transmission in which errors are detected by using check sums.

Known are various conventional automatic performing systems: an automatic performing system in which performance information is transmitted from a master instrument to a slave instrument; an automatic performing piano in which performance information is read from a floppy disc and is transmitted from a main controller to a sub controller for actuating key drive solenoids; and other automatic performing systems for reproducing performance by transmitting performance information from a performance information transmitting unit to a performance information receiving and reproducing unit. In these prior art systems, the transmission of performance information is designated in one direction only: the master instrument and the main controller transmit performance information to the slave instrument and the sub controller, respectively, on a real-time basis. Therefore, errors cannot be detected by using check sums as in the case of packet transmission. Instead, the receiving unit such as the slave instrument or the sub controller provided with a structure for detecting errors transmission by using parity check, such that if an error found in the transmission of performance information, received performance information is discarded.

In the prior art systems, the discard of incorrectly received performance information causes several problems. For example, when an incorrectly received off-event is discarded, an on-event cannot be terminated, undesirably continuing sound emission. Such problems result in undesirable noise interfering with other sound emission in an electronic instrument, for example. In the automatic performing piano, the key drive solenoids are damaged due to their continued actuation.

Even when the automatic performing systems have no structure for detecting errors and discarding incorrectly received performance information, problem still occurs. For example, if the transmission of key number data in event data has an error, the on-event of the corresponding key misses the counterpart off-event. Consequently, the performance information cannot be correctly processed, thereby damaging the key drive solenoids and causing other aforementioned problems.

In the prior-art systems, packet transmission is a known communication method in which errors are detected by using a check sum covering a predetermined number of bytes of transmitted or received data. If this method is applied to the automatic performing systems, however, the reproduction of performance information is interrupted for check. Consequently, the check function in packet transmission systems cannot be applied to the automatic performing systems in which data is transmitted on a real-time basis. Further in the packet transmission systems, data is transmitted by handshaking and a port is required for the handshaking. Automatic performing systems obviating the need for such a port have been desired.

In the prior-art automatic performing systems for reproducing performance by transmitting performance information from the performance information transmitting unit to the receiving unit, the incorrectly received performance information causes problems. The same problems also occur in automatic performing systems for recording performance information. Specifically, if performance information is incorrectly received and an on-event does not have the counterpart off-event, performance information is incorrectly recorded. When the incorrectly recorded performance information is reproduced, key drive solenoid damage or other aforementioned problems occur even if the recorded performance information is correctly received for reproduction.

SUMMARY OF THE INVENTION

Wherefore, an object of this invention is to provide an automatic performing system in which an error in the transmission of performance information is corrected by transmitting and receiving the performance information between performance information transmitting and receiving units, such that performance is reproduced and/or recorded by using correct performance information.

Another object of this invention is to provide an automatic performing system in which an error in the transmission of performance information fails to result continued sound emission, damaged key drive solenoids or other related problems.

In order to achieve the above object, as shown FIG. 1, one embodiment of the automatic performing system according to the present invention includes a performance information transmitting means M1 and a performance information receiving means M2, for transmitting and receiving performance information therebetween to reproduce and/or record performance based on the performance information.

The performance information receiving means M2 is provided with a returning means M3 for returning received performance information to the performance information transmitting means M1 before the performance is reproduced and/or recorded based on the received performance information. The performance information transmitting means M1 is provided with a determining means M4 for determining whether or not transmitted performance information is correctly received by the performance information receiving means M2 based on the performance information returned by the returning means M3. The performance information transmitting means M1 is further provided with a retransmitting means M5 for prohibiting the performance information receiving means M2 from using the received performance information and for transmitting the transmitted performance information again to the performance information receiving means M2, when the determining means M4 determines that the transmitted performance information is incorrectly received by the performance information receiving means M2.

In operation of the above structured automatic performing system, the performance information transmitted from the performance information transmitting means M1 is returned to the performance information transmitting means M1 by the returning means M3 of the performance information receiving means M2, without reproducing and/or recording the performance immediately. In the performance information transmitting means M1, the determining means M4 determines based on the returned performance information whether or not the transmitted performance information is correctly received by the performance information receiving means M2. If the determining means M4 determines that the transmitted performance information is incorrectly received by the performance information receiving means M2, the retransmitting means M5 prohibits the performance information receiving means M2 from using the received performance information and transmits the transmitted performance information again to the performance information receiving means M2.

Therefore, the incorrectly received performance information is not used for reproducing and/or recording a performance. The performance information is repeatedly transmitted, such that the performance is reproduced and/or recorded based on the correctly received performance information. Consequently, the performance can be reproduced with an on-event and an off-event occurring correctly in pairs, thereby causing neither undesirable continued sound emission nor key drive solenoid damage. Further, performance is correctly recorded, having correct correlation of an on-event and an off-event, and is reproduced with no errors by using the correctly recorded performance information.

BRIEF DESCRIPTION OF THE DRAWINGS

FIG. 3 is a table illustrating performance information to be stored in a memory unit of an automatic performing piano;

DETAILED DESCRIPTION OF THE PREFERRED EMBODIMENT

Embodiments of an automatic performing piano incorporating the present invention will now be explained.

Figure 1:
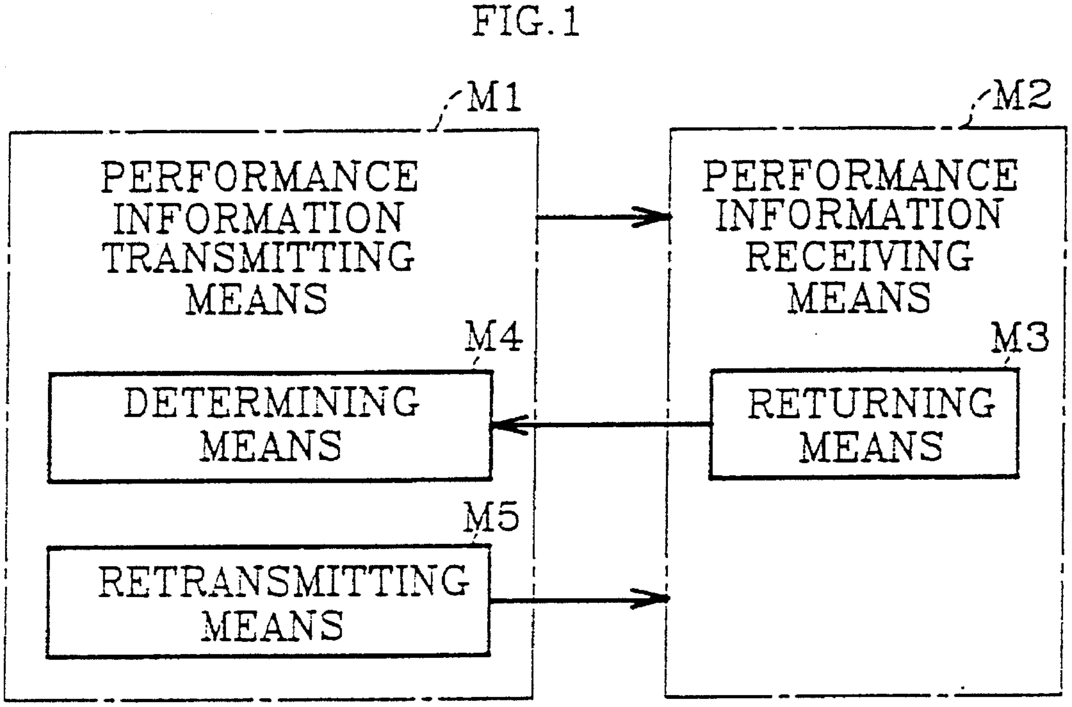
FIG. 1 is a schematic block diagram showing the structure of an automatic performing system according to one embodiment of the present invention.
Figure 2:
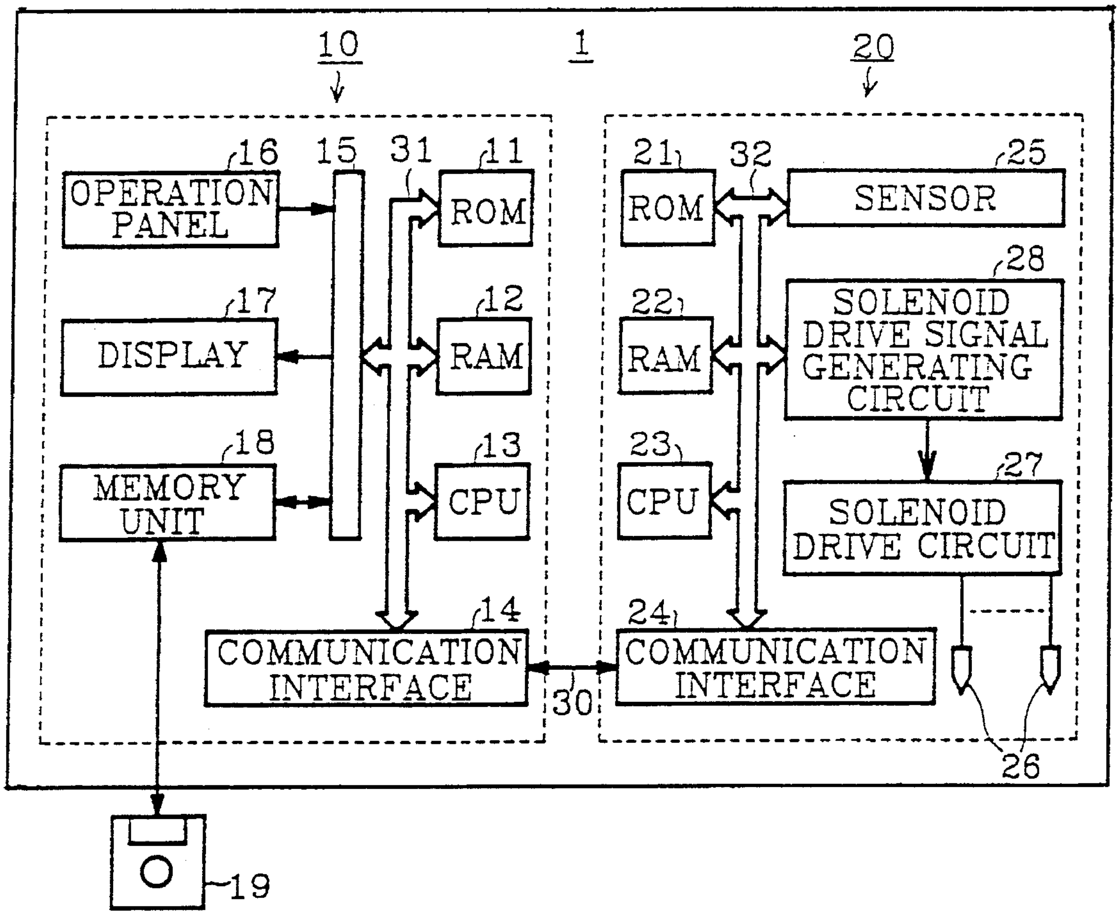
FIG. 2 is a schematic block diagram of an automatic performing piano embodying the present invention.

As shown in FIG. 2, an automatic performing piano 1 is provided with a main controller 10 and a key controller 20. The key controller 20 receives and transmits performance information from and to the main controller 10. With the automatic performing piano 1, a performance can be reproduced based on the performance information and can be recorded according to a performer's operation of the keys.

The main controller 10 includes a computer comprising a ROM 11, a RAM 12, a CPU 13 and a communication interface 14. These components are connected to an input/output interface 15 via an input/output port 31. The input/output interface 15 is connected to an operation panel 16 for selecting a reproduction mode, a record mode or other operation mode, as well as to a display 17 and a memory unit 18. When the reproduction mode is selected on the operation panel 16, the memory unit 18 stores performance information read out from a floppy disc 19.

The key controller 20 also includes a computer comprising a ROM 21, a RAM 22, a CPU 23 and a communication interface 24. These components are connected via an input/output port 32 to a sensor 25, for detecting the operation and condition of keys in a record mode, and to a solenoid drive signal generating circuit 28, for giving a solenoid drive signal to a solenoid drive circuit 27 connected to key drive solenoids 26 in the reproduction mode.

The communication interfaces 14 and 24 of the main and key controllers 10 and 20 are connected to each other via a communication line 30 for exchanging various information and signals therebetween. The communication interfaces 14, 24 of the main and key controllers 10, 20 are provided with a transmitting register and a receiving register, respectively. Transmitted and received information are allocated at the transmitting and receiving registers, respectively.

Figure 4:
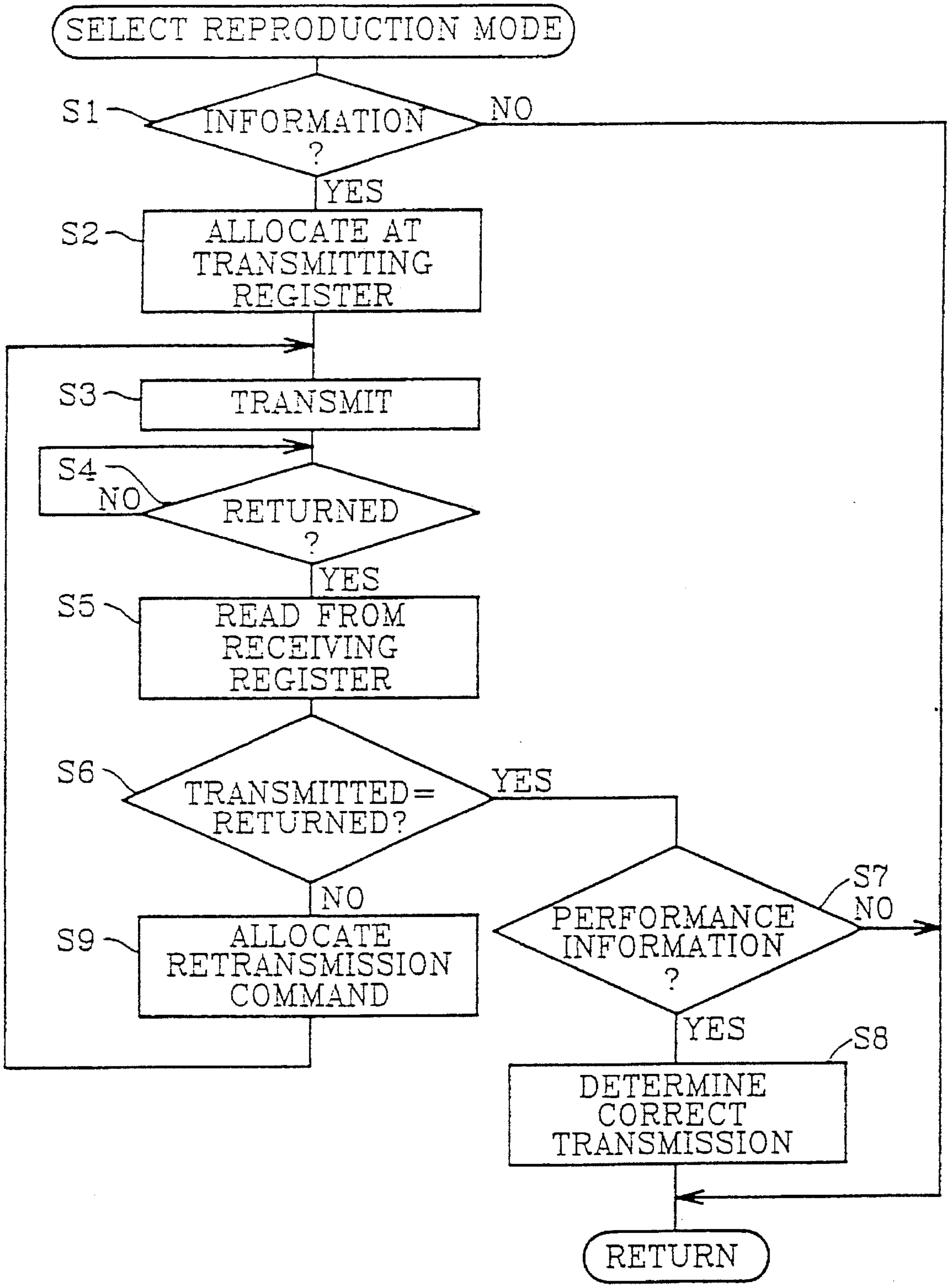
FIG. 4 is a flowchart illustrating the process steps of a main controller in a reproduction mode in a first embodiment of the present invention.
Figure 5:
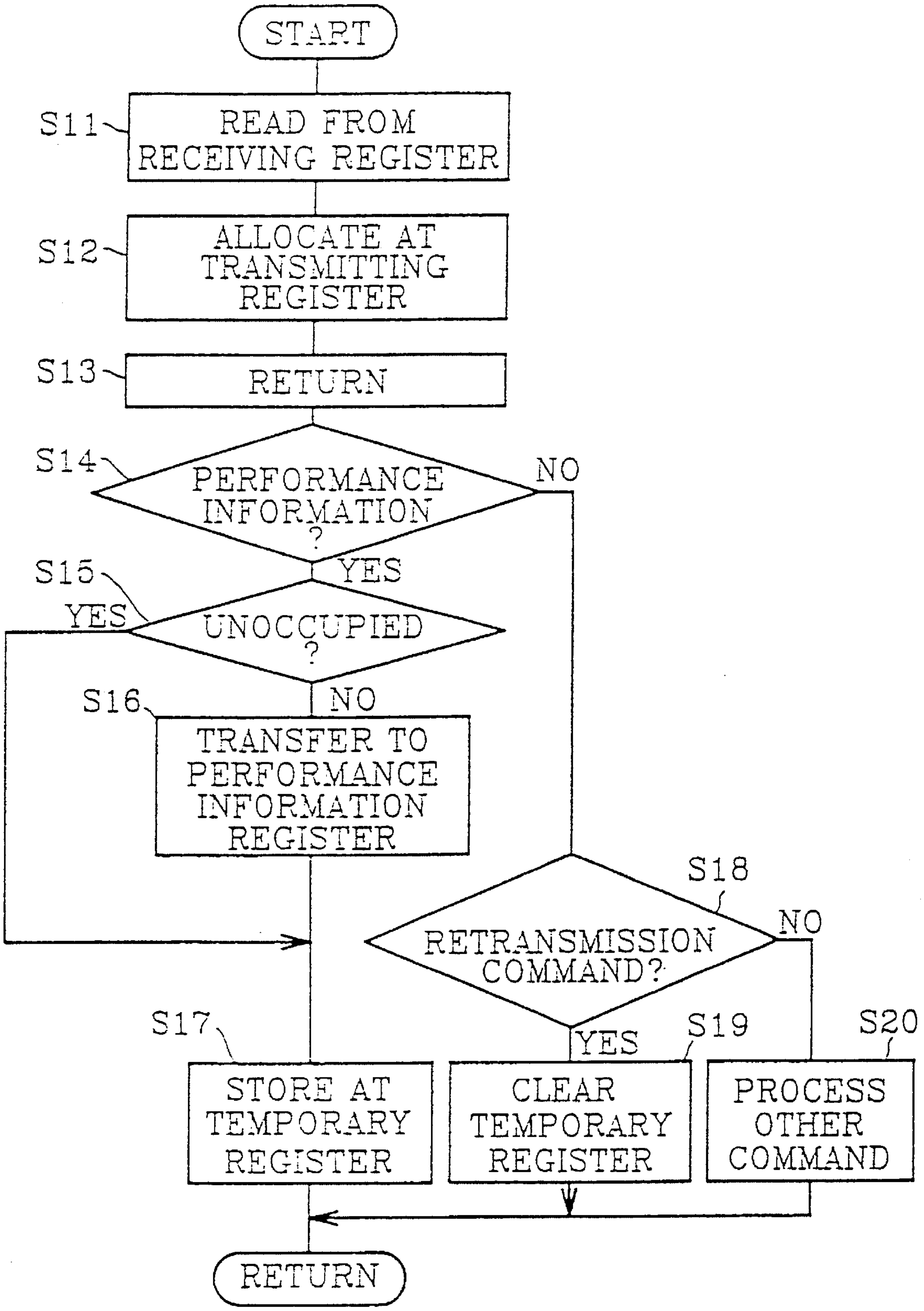
FIG. 5 is a flowchart illustrating the process steps of a key controller in the reproduction mode in the first embodiment of the present invention.

Process steps of a first embodiment are now explained by referring to the flowcharts of FIGS. 4 and 5. In the first embodiment of the automatic performing piano 1, a reproduction mode is selected.

When the reproduction mode is selected on the operation panel 16, performance information is read out from the floppy disc 19 and is stored in the memory unit 18. As shown in FIG. 3, the performance information comprises multiple sets of event data formed of four bytes: identification code stored at a first byte; key number data at a second byte; key depression intensity data at a third byte; and time data at a fourth byte. The occurrence of an off-event is determined by writing into the floppy disc 19 key release speed data or just a key depression intensity of zero as the key depression intensity data. The time data is a relative time period elapsed from the previous event or an absolute time period from a reference point either of which was written into the floppy disc 19.

As shown in the flowchart of FIG. 4, when the reproduction mode is selected on the operation panel 16, process starts. At step S1, it is first determined in the main controller 10 whether or not performance information to be transmitted exists in the memory unit 18. If it is determined to be "YES" at step S1, the performance information is allocated at the transmitting register provided in the communication interface 14 at step S2. The transmitting register has a capacity of one byte of data.

Subsequently, at step S3 the performance information is transmitted from the communication interface 14 of the main controller 10 to the communication interface 24 of the key controller 20, and it is determined at step S4 whether or not transmitted information is returned from the key controller 20. If at step S4 the transmitted information is not returned, the main controller 10 still waits for returned information from the key controller 20.

If the transmitted information has been returned at step S4, the returned information is allocated at the receiving register in the communication interface 14, and at step S5 the returned information is read out from the receiving register. The receiving register has a capacity of one byte of data. Subsequently, it is determined at step S6 whether or not the performance information allocated at the transmitting register at step S2 is equal to the returned information read out from the receiving register at step S5.

If the transmitted information equals the returned information at step S6, it is determined at step S7 whether or not the transmitted and returned information are both performance information.

If it is "YES" at step S7, it is determined at step S8 that the performance information has been correctly transmitted to the key controller 20. After the process returns, steps S1–S6 are repeated. Specifically, the next performance information to be transmitted is identified in the memory unit 18, and the existing performance information is allocated at the transmitting register. The performance information is transmitted from the communication interface 14 of the main controller 10 to the communication interface 24 of the key controller 20, and is returned from the key controller 20. The returned information from the key controller 20 is compared with the transmitted information to determine the equality or the inequality of both the information.

If it is "NO" at step S7, process returns without going to step S8. Therefore, the same performance information as the previous one is processed again by repeating steps S1–S6.

If it is "NO" at step S6, a retransmission command is allocated at the transmitting register in the communication interface 14 at step S9. This retransmission command indicates to the key controller 20 to cancel the received information and wait for the next transmission. Subsequently, at step S3 the retransmission command is transmitted from the communication interface 14 of the main controller 10 to the communication interface 24 of the key controller 20.

Subsequently, it is determined at step S4 whether or not transmitted information is returned from the key controller 20. If it is "YES" at step S4, the returned information from the key controller 20 is allocated at the receiving register in the communication interface 14. Therefore, at step S5 the returned information is read out from the receiving register. It is then determined at step S6 whether or not the retransmission command allocated at the transmitting register at step S9 is equal to the returned information read out from the receiving register at step S5. If it is "YES" at step S6 and "NO" at step S7, the retransmission command has been correctly transmitted. The process then skips step S8 and returns to process the same performance information as the previous one.

While processing in the main controller 10 proceeds as shown in the flowchart of FIG. 4, processing in the key controller 20 starts as shown in the flowchart of FIG. 5. First at step S11 in the key controller 20 the information allocated at the receiving register in the communication interface 24 is read out, and at step S12 the read information is allocated at the transmitting register in the communication interface 24. Subsequently, at step S13 the information allocated at the transmitting register immediately returned via the communication interface 24 to the main controller 10. It is then determined at step S14 whether or not the information allocated at the receiving register at step S11 is performance information.

If it is determined to be performance information at step S14, it is determined at step S15 whether or not a temporary register in the RAM 22 is unoccupied. The temporary register has a capacity of four bytes, and can thus store one complete event data at the same time. If it is determined that the temporary register is occupied at step S15, at step S16 the information allocated in the temporary register is sequentially transferred to a performance information register in the RAM 22, thereby clearing the temporary register. The performance information register has a capacity of one byte. Subsequently, at step S17 the performance information allocated at the receiving register is stored into the cleared temporary register. If it is determined that the temporary register is not occupied at step S15, processing skips step S16 and goes to step S17.

If it is determined at step S14 that the information is not performance information, it is next determined at step S18 whether or not the information allocated at the receiving register at step S11 is a retransmission command. If it is "YES" at step S18, at step S19 the temporary register is cleared. If it is "NO" at step S18, then at step S20, processing proceeds in response to a start command, a stop command or command other than the retransmission command.

The entire flow of processing in the automatic performing piano 1 of the first embodiment of the present invention will now be explained.

After information is transmitted from the main controller 10 to the key controller 20 at step S3 of the flowchart in FIG. 4, the information is written and allocated at the receiving register of the communication interface 24 at step S11 of the flowchart in FIG. 5, and is also returned to the main controller 10 at step S13. Therefore, at step S6 it can be easily determined based on the returned information in the main controller 10, whether or not the information is correctly received in the key controller 20.

If it is determined at step S6 that the transmitted information is incorrectly received, the retransmission command is allocated in the main controller 10 at step S9 and is transmitted from the main controller 10 to the key controller 20 at step S3. In response to the retransmission command, the temporary register in the key controller 20 is cleared at step S19. At steps S14–S17, only when performance information is received in the key controller 20 with the temporary register of the RAM 22 occupied by previous performance information, the previous performance information will be transferred to the performance information register for the reproduction of performance.

On the other hand, when the performance information is incorrectly received in the key controller 20, no subsequent performance information is transmitted from the controller 10 to the key controller 20. Consequently, the retransmission command is transmitted from the controller 10 to the key controller 20, the reproduction of performance information based on the performance information to be canceled is prohibited.

In the key controller 20, the received retransmission command is also returned to the main controller 10 at step S13. If the retransmission command is incorrectly received in the key controller 20, the retransmission command is repeatedly transmitted from the main controller 10 to the key controller 20. If the retransmission command is correctly received in the key controller 20, processing returns from step S7 to step S1 in the main controller 10. Additionally, since step S8 is thus skipped, the same performance information at steps S1–S3 as the performance information previously read from the memory unit 18 is again allocated at the transmitting register in the communication interface 14, and is transmitted from the communication interface 14 to the key controller 20. Consequently, the retransmission command and the same performance information are repeatedly transmitted to the key controller 20 until the performance information is correctly received in the key controller 20.

If it is determined in the main controller 10 that the transmitted information is correctly received in the key controller 20 and the transmitted and returned information are both performance information, it is determined at step S8 that the performance information has been correctly transmitted. Subsequently, process returns and repeats steps S1–S6, such that the next performance information is read out from the memory unit 18 and transmitted.

In the automatic performing piano 1 according to this embodiment of the present invention, one piece of performance information or a retransmission command can be transmitted, returned and evaluated each 10 microseconds by the main and key controllers 10,20. Even when in response to the retransmission command the temporary register is repeatedly cleared, the quick processing in the main and key controllers 10, 20 assures the correct reproduction and/or recording of the performance information. The continuous flow of performance information is thus uninterrupted.

Figure 6:
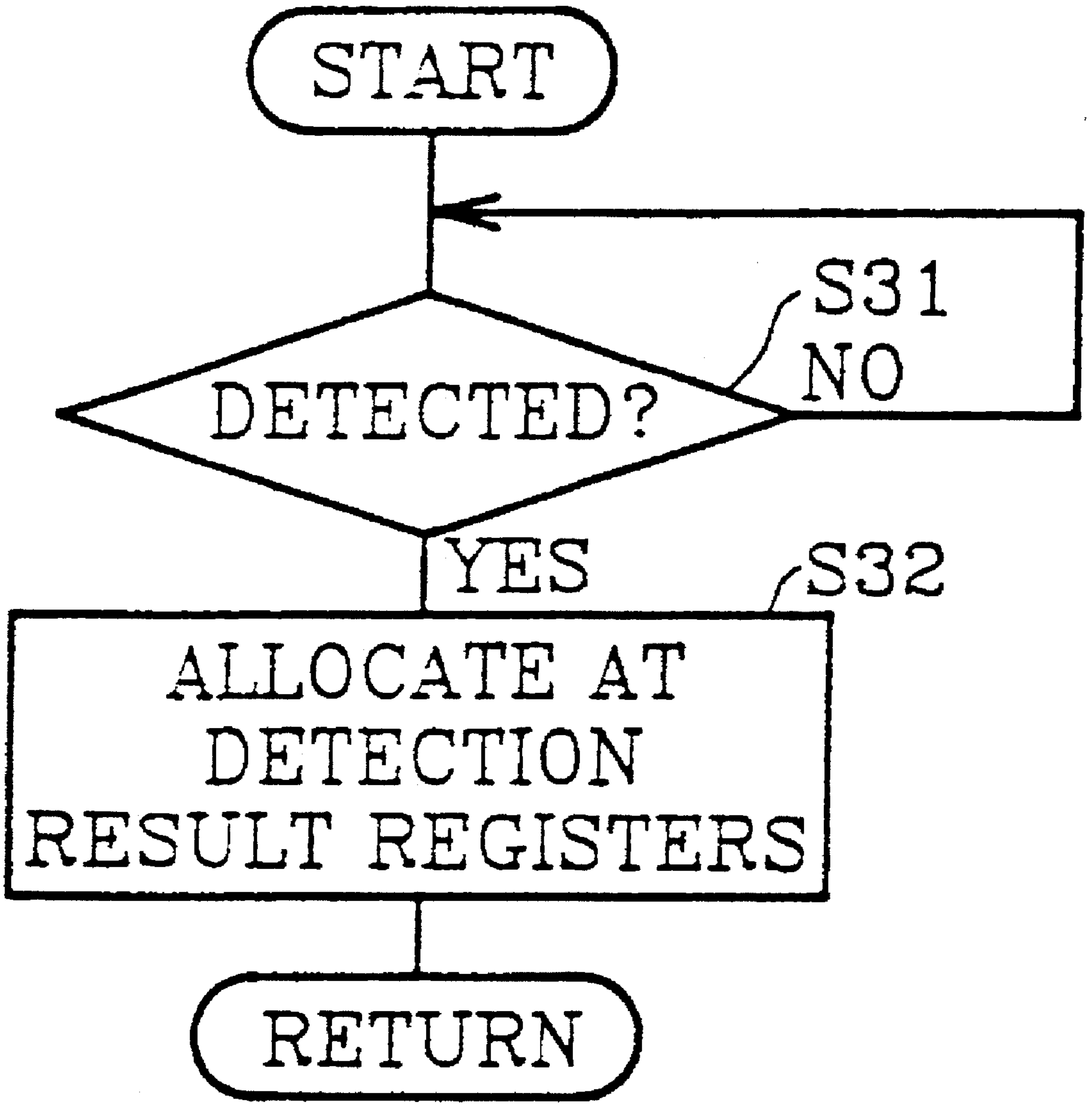
FIG. 6 is a flowchart illustrating the process steps of the key controller in a record mode in a second embodiment of the present invention.
Figure 7:
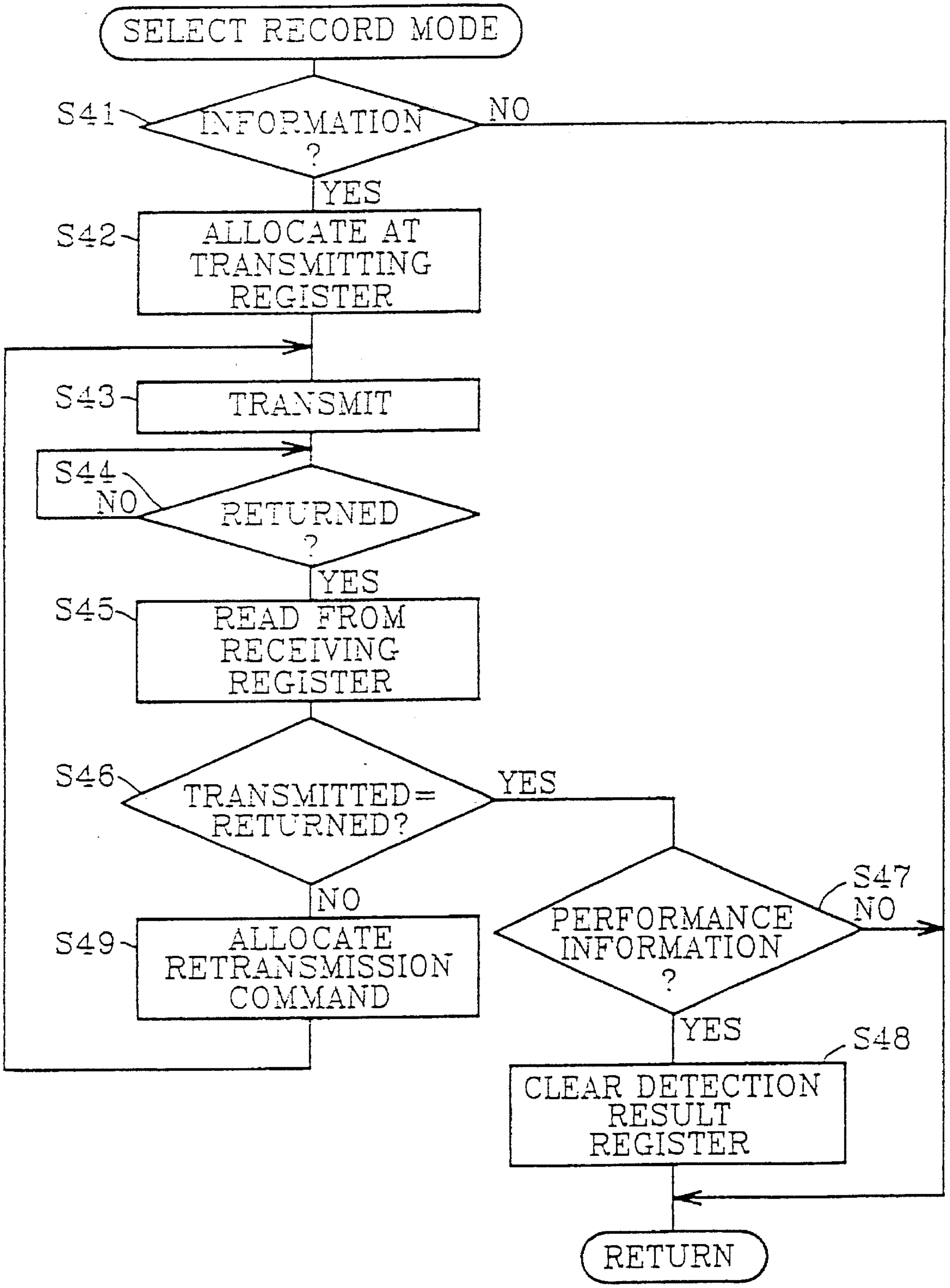
FIG. 7 is a flowchart illustrating further process steps of the key controller in the record mode in the second embodiment of the present invention.
Figure 8:
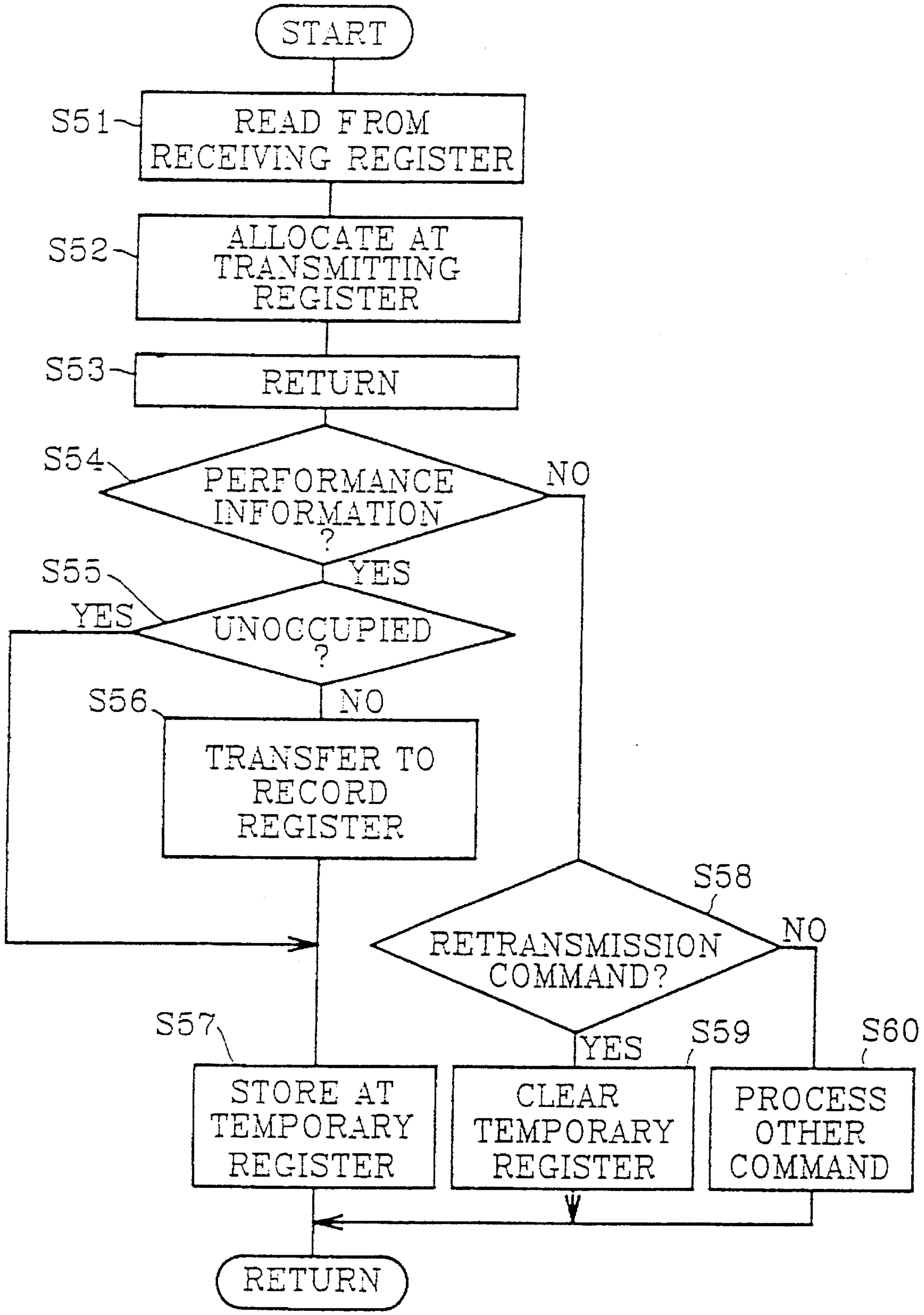
FIG. 8 is a flowchart illustrating the process steps of the main controller in the record mode in the second embodiment of the present invention.

Processing steps of a second embodiment of the present invention are now explained by referring to the flowcharts of FIGS. 6–8. In the second embodiment of the automatic performing piano 1, a record mode is selected. Although the process steps in the second embodiment are similar to those in the first embodiment, in the second embodiment the key controller 20 is a performance information transmitting unit and the main controller 10 is a performance information receiving and recording unit.

As shown in the flowchart of FIG. 6, when the record mode is selected on the operation panel 16, processing starts. At step S31, it is first determined in the key controller 20 whether or not the sensor 25 detects performance information to be recorded. The performance information includes key number data, key depression intensity data and other data. If it is "YES" at step S31, at step S32 the performance information is sequentially allocated to multiple detection result registers in the RAM 22.

As shown in the flowchart of FIG. 7, it is determined at step S41 whether or not performance information to be transmitted exists in the detection result registers. If it is "YES" at step S41, at step S42 the performance information is allocated to the transmitting register in the communication interface 24. The transmitting register has a capacity of one byte. Subsequently, at step S43 the performance information is transmitted from the communication interface 24 of the key controller 20 to the main controller 10, and it is determined at step S44 whether or not the transmitted information has been returned from the main controller 10.

If it is "NO" at step S44, the key controller 20 still waits for returned information from the main controller 10. If it is "YES" at step S44, the returned information is allocated to the receiving register in the communication interface 24, and at step S45, the returned information is read out from the receiving register. The receiving register has a capacity of one byte. Subsequently, it is determined at step S46 whether or not the performance information allocated to the transmitting register at step S42 is equal to the returned information read out from the receiving register at step S45.

If it is "YES" at step S46, it is determined at step S47 whether or not the transmitted and returned information are both performance information.

If it is "YES" at step S47, it is determined that the performance information has been correctly transmitted and at step S48, the detection result registers are cleared. After processing returns, the next performance information is processed by repeating steps S41–S48.

If it is "NO" at step S47, process returns without going to step S48. Therefore, the same performance information as the previous one is processed again by repeating steps S41–S46.

If it is determined that transmitted and returned performance information are not the same at step S46, at step S49 a retransmission command is allocated at the transmitting register in the communication interface 24. This retransmission command indicates that the main controller 10 is commanded to cancel received performance information and wait for the next transmission. Subsequently, at step S43 the retransmission command is transmitted from the communication interface 24 of the key controller 20 to the main controller 10. Subsequently, it is determined at step S44 whether or not transmitted information is returned from the main controller 10. If it is "YES" at step S44, the returned information from the main controller 10 is allocated at the receiving register in the communication interface 24. Therefore, at step S45 the returned information is read out from the receiving register. It is next determined at step S46 whether or not the retransmission command allocated at the transmitting register at step S49 is equal to the returned information read out from the receiving register at step S45. If it is "YES" at step S46 and "NO" at step S47, the retransmission command has been correctly transmitted. Processing skips step S48 and returns to process the same performance information as the previous one.

While processing in the key controller 20 proceeds as shown in the flowchart of FIG. 7, processing in the main controller 10 starts as shown in the flowchart of FIG. 8. First at step S51, in the main controller 10, the performance information allocated at the receiving register in the communication interface 14 is read out, and at step S52 the read information is allocated to the transmitting register in the communication interface 14. Subsequently, at step S53 the information allocated to the transmitting register is immediately returned via the communication interface 14 to the key controller 20. It is then determined at step S54 whether or not the information allocated at the receiving register at step S51 is performance information.

If it is "YES" at step S54, it is determined at step S55 whether or not a temporary register in the RAM 12 is unoccupied. The temporary register has a capacity of four bytes and can thus store one event data at the same time. If it is "NO" at step S55, at step S56 the information allocated at the temporary register is transferred sequentially to a record register in the RAM 12, thereby clearing the temporary register. The record register has a capacity of one byte. Subsequently, at step S57 the performance information allocated at the receiving register at step S51 is stored into the cleared temporary register. If it is "YES" at step S55, process skips step S56 and goes to step S57.

If it is determined at step S54 that the information is not performance information, it is determined at step S58 whether or not the information allocated at the receiving register at step S51 is a retransmission command. If it is "YES" at step S58, the temporary register is cleared at step S59. If it is "NO" at step S58, at step S60 processing continues in response to a start command, a stop command or other received command.

As previously mentioned, when the record mode is selected on the operation panel 16, a performance is correctly recorded based on the performance information detected by the sensor 25. In the second embodiment, recording of performance based on incorrectly received performance information is prevented. Thus, since in recorded performance information an on-event is correctly followed by a corresponding off-event as required, the occurrence of the on-event exactly precedes that of the off-event during the reproduction of the recorded performance information. Consequently, a performance can be recorded and reproduced with high fidelity. Further, during the reproduction of the performance, the key drive solenoids 26 are protected from excess heat and resulting damage, because the occurrence of an on-event is surely followed by the occurrence of an off-event.

This invention has been described above with reference to preferred embodiments as shown in the drawings. Modifications and alterations may become apparent to the one skilled in the art upon reading and understanding the specification. Despite the use of the embodiment for illustration purposes, it is intended to include all such modifications and alterations within the scope and the spirit of the appended claims.

For example, the present invention is applied to the automatic performing piano described in the embodiments, but can also be applied to a sequencer or other electronic instruments. Performance can be reproduced or recorded with high fidelity, without being based on the incorrectly received performance information.

Further, the present invention can be applied to an automatic performing system in which the performance on a master instrument is transmitted to a slave instrument for the reproduction of the performance.

In the present embodiments, the use of incorrectly received information is prohibited by clearing a temporary register. The prohibition of the use, however, can be executed in other various ways.

What is claimed is:

1. An automatic performing system having a performance reproducing mode for reproducing a pre-recorded musical performance stored in a memory, said system comprising: a main controller and a key controller and, in order for said system to be operable in said reproducing mode, (I) said main controller comprising:

(a) a main controller communication interface being coupled to a key controller communication interface of said key controller via a communication line; and (b) said memory, being coupled to said main controller communication interface, for permanently storing pre-recorded musical performance as performance information and for supplying said performance information to said main controller communication interface;

said main controller communication interface including:

(1) main controller transmitting means, being coupled to said communication line, for transmitting said performance information to said key controller via said communication line;

(2) main controller holding means, being coupled to said main controller transmitting means, for temporarily storing said performance information transmitted to said key controller;

(3) main controller receiving means, being coupled to said communication line, for receiving information from said key controller;

(4) main controller determining means, being coupled to said main controller receiving means, said main controller transmitting means, and said main controller holding means, for determining whether transmitted performance information is correctly received by said key controller; and (5) main controller retransmitting means, being coupled to said main controller determining means and said communication line, for transmitting an instruction concerning the performance information received by said key controller in response to an output of said main controller determining means;

(II) said key controller, including said key controller communication interface for receiving and transmitting information, said key controller communication interface comprising:

(1) key controller receiving means, being coupled to said communication line, for receiving said transmitted performance information from said main controller;

(2) key controller holding means, being coupled to key controller receiving means and said communication line, for temporarily storing said performance information received from said main controller via said communication line; and (3) key controller transmitting means, being coupled to said communication line and said key controller receiving means, for returning to said main controller said performance information received by said key controller;

(III) wherein, during operation in said reproducing mode:

(a) said main controller determining means, upon receipt of said performance information returned to said main controller, determines whether said performance information is correctly received by said key controller by comparing the performance information stored in said main controller holding means with the performance information returned to said main controller;

(b) said main controller retransmitting means, only in response to a determination by said main controller determining means that said performance information is incorrectly received by said key controller, transmits an instruction to said key controller holding means to discard said performance information temporarily stored in said key controller holding means and said main controller transmitting means retransmits the performance information to said key controller receiving means; and (c) said main controller transmitting means, only in response to a determination by said main controller determining means that said performance information is correctly received by said key controller, transmits further performance information to said key controller receiving means.

2. A system according to claim 1, wherein said key controller, in order for said system to be operable in said reproducing mode, further comprises:

(a) a solenoid drive circuit coupled to said key controller holding means, said solenoid drive circuit, upon receipt of only correctly received performance information by said key controller, formulates a solenoid activation signal corresponding to said performance information correctly received from said main controller and temporarily stored in said key controller holding means; and (b) a plurality of key drive solenoids coupled to said solenoid drive circuit, said plurality of drive solenoids, when coupled to a plurality of keys of a musical instrument, respond to said solenoid activation signal for actuating the plurality of keys and thereby reproducing said pre-recorded performance based only upon correctly received performance information.

3. A system according to claim 1, further including a performance recording mode, for recording live performance information, and in order for said system to be operable during said recording mode, (I) said key controller further comprises:

(a) a sensor, for detecting and supplying live performance information, coupled to said key controller communication interface;

(b) key controller determining means, coupled to said key controller receiving mean, said key controller transmitting means and said key controller holding means, for determining whether transmitted live performance information is correctly received by said main controller; and (c) key controller retransmitting means, coupled to said key controller determining means and said communication line, for transmitting an instruction concerning live performance information received by said main controller in response to an output of said key controller determining means;

(II) said main controller further comprises:

(a) main controller recording means coupled to said communication line and said memory for recording only correctly received live performance information in said memory;

(III) during operation of said system in said recording mode:

(a) said sensor, when coupled to a musical instrument, detects live performance information;

(b) said key controller transmitting means transmits detected live performance information to said main controller receiving means;

(c) said key controller holding means temporarily stores said live performance information transmitted to said main controller;

(d) said main controller holding means temporarily stores said live performance information received from said key controller;

(e) said main controller transmitting means returns said live performance information to said key controller receiving means;

(f) said key controller determining means determines, upon receipt of said live performance information returned by said main controller, whether said live performance information is correctly received by said main controller by comparing the live performance information stored in said key controller holding means with the live performance information returned to said key controller;

(g) said key controller retransmitting means transmits, only in response to a determination by said key controller determining means that said live performance information is incorrectly received by said main controller, an instruction to said main controller holding means to discard the live performance information stored in said main controller holding means and said key controller transmitting means retransmits the live performance information to said main controller receiving means;

(h) said key controller transmitting means, only in response to a determination by said key controller determining means that said live performance information is correctly received by said main controller receiving means, transmits additional live performance information to said main controller receiving means; and (i) said main controller recording means records only correctly received live performance information in said memory.

4. A system according to claim 3, wherein said sensor comprises a plurality of individual sensor devices, which, when respectively coupled to a plurality of keys of a musical instrument, (i) detect operation and condition of the plurality of keys upon actuation of the keys during a musical performance, and (ii) generate said live performance information, from and corresponding to said operation and condition information;

whereby said memory of said main controller records only correctly received live performance information.

5. A system according to claim 4, wherein said memory comprises at least one of a memory device and a disk drive device.

6. A system according to claim 1, wherein said main controller comprises at least:

a central processor for controlling operation of the system, a RAM, and a ROM, all of which are interconnected via an input/output bus;

said key controller comprises a central processing unit having at least:

a central processor for controlling operation of the system, a RAM, and a ROM, all of which are interconnected via an input/output bus.

7. An automatic performing system having a performance reproducing mode for reproducing a pre-recorded musical performance stored in memory, said system comprising: a main controller and a key controller and, in order for said system to be operable in said reproducing mode, (I) said main controller comprising:

(a) a main controller communication interface being coupled to a key controller communication interface of said key controller via a communication line;

(b) said memory device, being coupled to said main controller communication interface, for permanently storing pre-recorded musical performance as performance information and for supplying said performance information to said main controller communication interface;

said main controller communication interface including:

(1) a main controller transmitting device, being coupled to said communication line, for transmitting said performance information to said key controller via said communication line;

(2) main controller holding device, being coupled to said main controller transmitting device, for temporarily storing said performance information transmitted to said key controller;

(3) a main controller receiving device being coupled to said communication line, for receiving information from said key controller;

(4) a main controller determining device, being coupled to said main controller receiving device, said main controller transmitting device and said main controller holding device, for determining whether transmitted performance information is correctly received by said key controller; and (5) a main controller retransmitting device being coupled to said main controller determining device and said communication line, for transmitting an instruction concerning the performance information received by said key controller in response to an output of said main controller determining device;

(II) said key controller, including said key controller communication interface for receiving and transmitting information, said key controller communication interface comprising:

(1) a key controller receiving device, being coupled to communication line, for receiving said transmitted performance information from said main controller;

(2) a key controller holding device, being coupled to key controller receiving device and said communication line, for temporarily storing said performance information received from said main controller via said communication line; and (3) a key controller transmitting device, being coupled to said communication line and said receiving device, for returning to said main controller said performance information received by said key controller;

(III) wherein, during operation in said reproducing mode;

(a) said main controller determining device, upon receipt of said performance information returned to said main controller, determines whether said performance information is correctly received by said key controller by comparing the performance information stored in said main controller holding device with the performance information returned to said main controller;

(b) said main controller retransmitting device, only in response to a determination by said main controller determining device that said performance information is incorrectly received by said key controller, transmits an instruction to said key controller holding device to discard said performance information temporarily stored in said key controller holding device and said main controller transmitting device retransmits the performance information to said key controller receiving device; and (c) said main controller transmitting device, only in response to a determination by said main controller determining device that said performance information is correctly received by said key controller, transmits further performance information to said key controller receiving device.

8. A system according to claim 7, further including a performance recording mode, for recording live performance information, and in order for said system to be operable during said recording mode, (I) said key controller further comprises:

(a) a sensor, coupled to said key controller communication interface, for detecting and supplying live performance information;

(b) a key controller determining device, coupled to said key controller receiving device, said key controller transmitting device and said key controller holding device, for determining whether transmitted live performance information is correctly received by said main controller; and (c) a key controller retransmitting device, coupled to said key controller determining device, for transmitting an instruction concerning live performance information received by said main controller in response to an output of said key controller determining device; and (d) a main controller recording device, coupled to said communication line and said memory, for recording only correctly received live performance information in said memory;

wherein during operation of said system in said recording mode:

(a) said sensor, when coupled to a musical instrument, detects live performance information;

(b) said key controller transmitting device transmits said live performance information to said main controller receiving device;

(c) said key controller holding device temporarily stores said live performance information transmitted to said main controller;

(d) said main controller holding device temporarily stores said performance information received from said key controller;

(e) said main controller transmitting device returns said live performance information to said key controller receiving device;

(f) said key controller determining device determines, upon receipt of said live performance information returned by said main controller, whether said live performance information is correctly received by said main controller by comparing the live performance information stored in said key controller holding device with the live performance information returned to said key controller;

(g) said key controller retransmitting device transmits, only in response to a determination by said key controller determining device that said live performance information is incorrectly received by said main controller, an instruction to said main controller holding device to discard the live performance information stored in said main controller holding device and said controller transmitting device retransmits the live performance information to said main controller receiving device; and (h) said key controller transmitting device, only in response to a determination by said key controller determining device that said live performance information is correctly received by said main controller receiving device, transmits further live performance information to said main controller receiving device; and (i) said main controller recording device records only correctly received live performance information in said memory.

9. An automatic performing system having a musical instrument with a plurality of keys and a plurality of sound generating mechanisms, coupled to said plurality of keys, for generating sound upon actuation of said of keys and thereby producing a musical performance, said system including a performance reproducing mode for selectively reproducing a musical performance on said musical instrument that has been pre-recorded, said system comprising: a main controller and a key controller and, in order for said system to be operable in said reproducing mode, (I) said main controller comprising:

(a) a main controller communication interface being coupled to a key controller communication interface of said key controller via a communication line; and (b) a memory, being coupled to said main controller communication interface, for permanently storing pre-recorded musical performance as performance information and for supplying said performance information to said main controller communication interface;

said main controller communication interface including:

(1) main controller transmitting means, being coupled to said communication line, for transmitting said performance information to said key controller via said communication line;

(2) main controller holding means, being coupled to said main controller transmitting means, for temporarily storing said performance information transmitted to said key controller;

(3) main controller receiving means, being coupled to said communication line, for receiving information from said key controller;

(4) main controller determining means, being coupled to said main controller receiving means, said main controller transmitting means and said main controller holding means, for determining whether transmitted performance information is correctly received by said key controller; and (5) main controller retransmitting means, being coupled to said main controller determining means and said communication line, for transmitting an instruction concerning the performance information received by said key controller in response to an output of said main controller determining means;

(II) said key controller, including said key controller communication interface for receiving and transmitting information, said key controller communication interface comprising:

(1) key controller receiving means, being coupled to said communication line, for receiving said transmitted performance information from said main controller;

(2) key controller holding means, being coupled to key controller receiving means and said communication line, for temporarily storing said performance information received from said main controller via said communication line; and (3) key controller transmitting means, being coupled to said communication line and said receiving means, for returning to said main controller said performance information received by said key controller;

(d) a solenoid drive circuit being coupled to said key controller holding means; and (e) a plurality of solenoids being coupled to said solenoid drive circuit;

(III) wherein, during operation in said reproducing mode:

(a) said main controller determining means, upon receipt of said performance information returned to said main controller, determines whether said performance information is correctly received by said key controller by comparing the performance information stored in said main controller holding means with the performance information returned to said main controller;

(b) said main controller retransmitting means, only in response to a determination by said main controller determining means that said performance information is incorrectly received by said key controller, transmits an instruction to said key controller holding means to discard said performance information temporarily stored in said key controller holding means and said main controller transmitting means retransmits the performance information to said key controller receiving means; and (c) said main controller transmitting means, only in response to a determination by said main controller determining means that said performance information is correctly received by said key controller, transmits further performance information to said key controller receiving means;

(d) said solenoid drive circuit, upon receipt of only correctly received performance information by said key controller, formulates a solenoid activation signal corresponding to said performance information correctly received from said main controller and temporarily stored in said key controller holding means; and (e) said solenoids, coupled to the plurality of keys of a musical instrument, are responsive to said solenoid activation signal for actuating the plurality of keys and thereby reproducing said recorded performance based only upon correctly received performance information.

10. A system according to claim 9, further including a performance recording mode, in which performance information is recorded, and in order for said system to be operable during said recording mode, (I) said key controller further comprises:

a plurality of sensor means, each coupled to a respective one of said plurality of keys of said musical instrument, for (i) detecting operation and condition of said plurality of keys upon actuation of said keys by a musician during a musical performance, and (ii) generating live performance information to be recorded that corresponds to said operation and condition information; and (II) said main controller comprises recording means coupled to said communication line and said memory for recording and permanently storing said live performance information in said memory.

11. A system according to claim 10, wherein said plurality of sensor means are coupled to said key controller communication interface and, in order for said system to be operable in said recording mode, (I) said key controller further comprises:

(a) key controller determining means, coupled to said key controller receiving means, said key controller transmitting means and said key controller holding means, for determining whether transmitted live performance information is correctly received by said main controller; and (b) key controller retransmitting means, coupled to said key controller determining means, for transmitting an instruction concerning live performance information received by said main controller in response to an output of said key controller determining means;

(II) said main controller further comprises:

(a) main controller recording means, coupled to said communication line and said memory, for recording only correctly received live performance information in said memory;

(III) during operation of said system in said recording mode:

(a) said plurality of sensor means detect live performance information;

(b) said key controller transmitting means transmits said live performance information to said main controller receiving means;

(c) said key controller holding means temporarily stores said live performance information transmitted to said main controller;

(d) said main controller holding means temporarily stores said live performance information received from said key controller;

(e) said main controller transmitting means returns said live performance information to said key controller receiving means;

(f) said key controller determining means determines, upon receipt of said live performance information returned by said main controller, whether said live performance information is correctly received by said main controller by comparing the live performance information stored in said key controller holding means with the live performance information returned to said key controller;

(g) said key controller retransmitting means transmits, only in response to a determination by said key controller determining means that said live performance information is incorrectly received by said main controller, an instruction to said main controller holding means to discard the live performance information stored in said main controller holding means and said key controller transmitting means retransmits the live performance information to said main controller receiving means; and (h) said key controller transmitting means, only in response to a determination by said key controller determining means that said live performance information is correctly received by said main controller receiving means, transmits additional live performance information to said main controller receiving means; and (i) said main controller recording means records only correctly received live performance information in said memory.

* * * * *